United States Patent [19]

Croteau

[11] Patent Number: 4,491,086
[45] Date of Patent: Jan. 1, 1985

[54] AUTOMATIC ANIMAL FEEDING DEVICE

[75] Inventor: Wildy Croteau, Chambly, Canada

[73] Assignee: Universal Automat Corp., Chambly, Canada

[21] Appl. No.: 573,103

[22] Filed: Jan. 23, 1984

[51] Int. Cl.³ .............................................. A01K 5/02
[52] U.S. Cl. ............................................... 119/51.11
[58] Field of Search ............. 119/51.11, 51.12, 52 AF; 222/412, 413

[56] References Cited

U.S. PATENT DOCUMENTS

| | | | |
|---|---|---|---|
| 3,698,361 | 10/1972 | Lecce | 119/51.11 |
| 3,962,997 | 6/1976 | Ruth | 119/51.11 |
| 4,082,064 | 4/1978 | Newell | 119/51.11 |
| 4,185,587 | 1/1980 | Kallin | 119/51.11 |
| 4,284,035 | 8/1981 | White | 119/51.11 |

FOREIGN PATENT DOCUMENTS

| | | | |
|---|---|---|---|
| 1041850 | 11/1978 | Canada | 119/51.11 |
| 1240108 | 7/1971 | United Kingdom | 119/51.11 |

Primary Examiner—Jay N. Eskovitz
Attorney, Agent, or Firm—Swabey, Mitchell, Houle, Marcoux & Sher

[57] ABSTRACT

An automatic animal feeder comprising a housing defining a feeding reservoir therein. An inlet opening is provided for receiving feed in the reservoir. An outlet opening is associated with a discharge device which is motor driven for conveying feed to a remote discharge outlet. An automatic timer controls a drive for operating the discharge device at predetermined time intervals and for predetermined time periods to thereby control the quantity of feed discharged at the remote discharge outlet during each of the time intervals.

7 Claims, 4 Drawing Figures

AUTOMATIC ANIMAL FEEDING DEVICE

BACKGROUND OF THE INVENTION (a) Field of Invention

The present invention relates to an automatic animal feeder and wherein predetermined quantity of feed can be automatically delivered at predetermined time intervals.

(b) Description of Prior Art

Various animal feeders are known. However, the majority of these feeder devices comprise a container having feed therein with manually operable gate mechanism whereby to release predetermined quantities or the entire feed stored in the housing. Such devices are also mainly for feeding large quantities of animals at a single feed station. When it is necessary to feed individual animals separated from one another by enclosures, it is necessary that a person feeds each animal individually. This is a time consuming process and also makes it difficult, if next to impossible, to feed all of the animals at substantially the same time whereby to establish a common regular diet for such animals. Further, adding to the time consuming operation, is the necessity for providing different feeds to different animals.

SUMMARY OF THE INVENTION

It is a feature of the present invention to provide an automatic animal feeder which is automatically operable to feed individual or individual groups of animals at predetermined times.

Another feature of the present invention is to provide an automatic animal feeder capable of feeding a predetermined quantity of feed at predetermined times.

Another feature of the present invention is to provide an automatic animal feeder capable of housing feed for several meals and wherein the feed is discharged by an automatic discharge device which is activated at predetermined times and capable of operating during a predetermined period of time.

According to the above features, from a broad aspect, the present invention provides an automatic animal feeder comprising a housing defining a feed reservoir. An inlet opening is provided for receiving feed in the reservoir. An outlet opening is also provided with discharge means associated therewith. Drive means activates the discharge means to convey feed to a remote discharge outlet. An automatic control means is provided for operating the drive means at predetermined time intervals and for predetermined time periods to thereby control the quantity of feed discharged at the remote discharge outlet during each of the time intervals.

BRIEF DESCRIPTION OF DRAWINGS

A preferred embodiment of the present invention will now be described with reference to the example thereof as illustrated in the accompanying drawings, in which.

DESCRIPTION OF PREFERRED EMBODIMENTS

Figure 1:
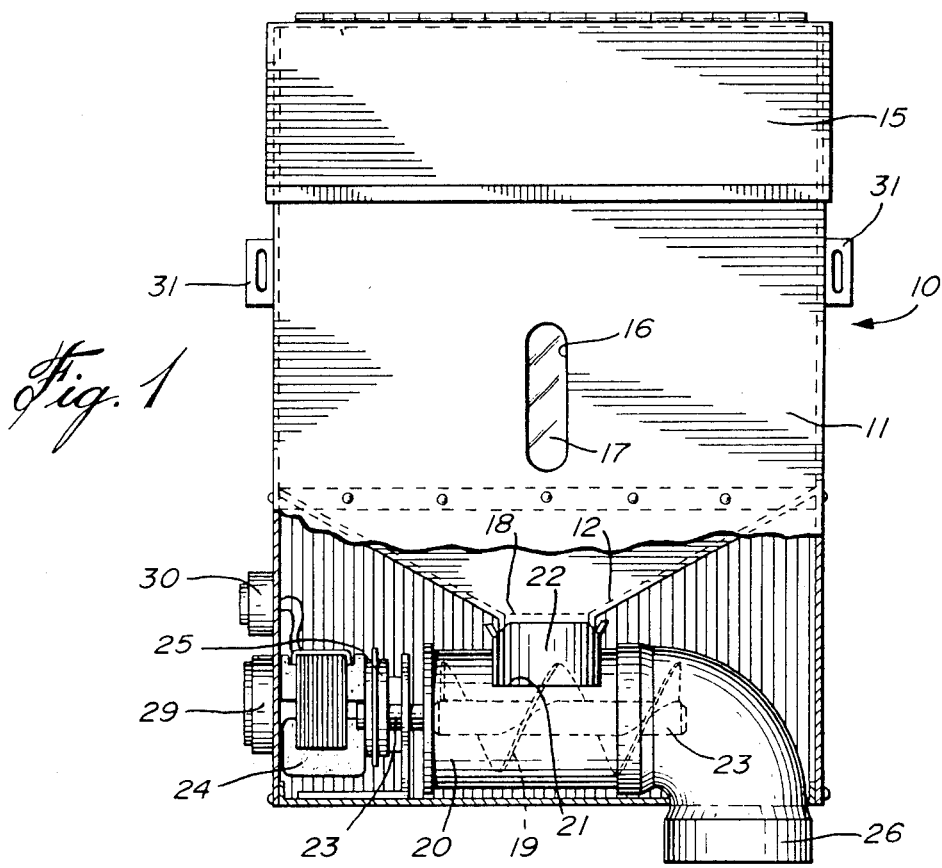
FIG. 1 is a front view, partly fragmented, of the automatic animal feeder of the present invention.
Figure 2:
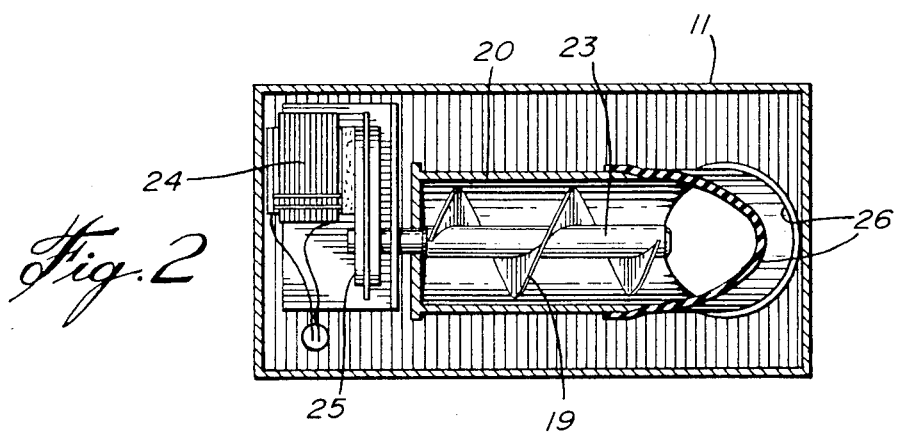
FIG. 2 is a section view showing the discharge means and its drive.
Figure 3:
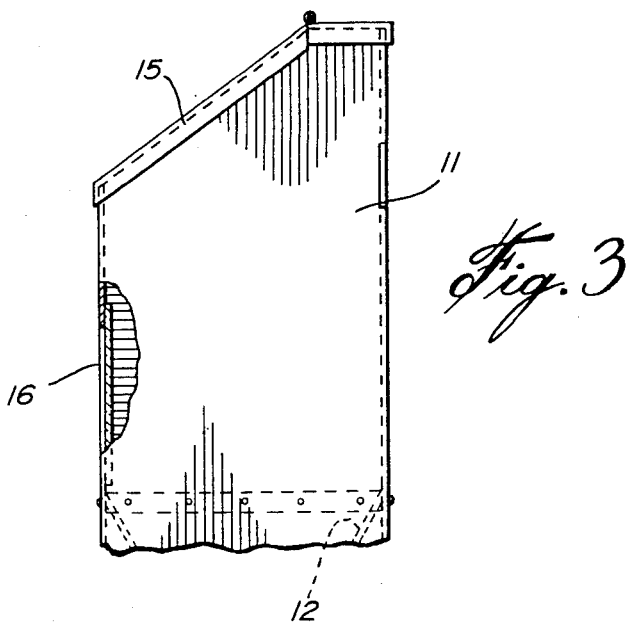
FIG. 3 is a fragmented side view of the automatic animal feeder.

Referring now to the drawings, there is shown generally at 10 the automatic animal feeder of the present invention. The feeder comprises a housing 11 defining therein a reservoir 12 for containment of a predetermined quantity of feed material 13. The feed material is placed into the housing through an inlet opening 14 which is closable by an hinged cover 15. A vertical slot opening 16 is provided in the front wall of the housing and is provided with a transparent window 17 thus, constituting a gauge whereby to visually determine the quantity of feed remaining in the reservoir 12.

The base of the reservoir 12 is conically tapered and is provided with a discharge opening 18. A rotatable conveyor discharge screw 19 is secured adjacent the opening 18 and located within a cylindrical housing 20 having an opening 21 in the side wall thereof and coupled to the outlet 18 by a sleeve 22 whereby feed is directed directly into a central portion of the conveyor screw 19. The screw is secured on a drive shaft 23 which is coupled to a drive motor 24 through a speed reducing coupling 25. As shown in FIG. 1, the conveyor screw 19 arrests the discharge of feed when idle. The outlet of the cylindrical tube 20 is connected to an outlet pipe 26 to which is coupled any suitable conveyor pipe, such as 27 schematically illustrated in FIG. 4, whereby to channel the feed 13 to an appropriate location or feed tray 28 located at a convenient position for access by the animal(s) being fed.

Figure 4:
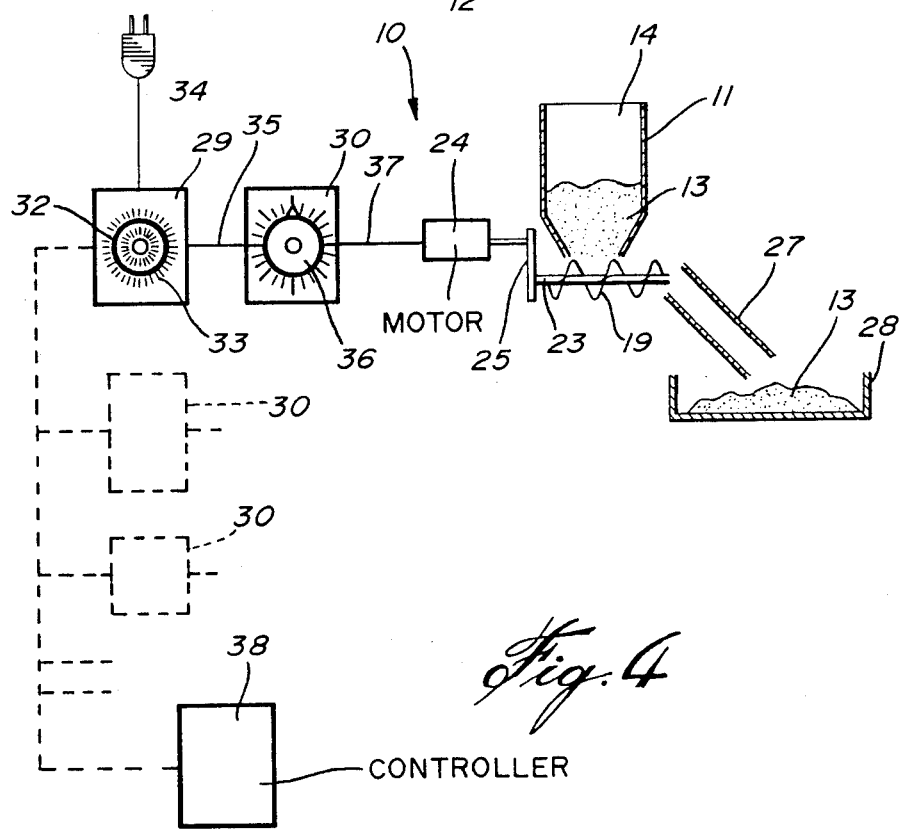
FIG. 4 is a schematic view showing the control circuit and a multi feeder system.

As shown in FIGS. 1 and 4 an automatic timer control mechanism constituted by a time clock mechanism 29 and a time regulating device 30 is provided to operate the motor 24 at predetermined time intervals and for predetermined time periods to thereby control the quantity of feed discharged through the outlet pipe 26 during each of the predetermined time intervals which are preset on the automatic timer control 29. This control device 29 is that commonly known in the art for regulating the power supply to lamps whereby to turn them on and off at predetermined times in a day. This device 29 feeds the power supply to the electric motor 24 but via a time regulating device 30 which will maintain the power supply for preselected time periods only. With the particular embodiment herein described, the reservoir contains approximately 40 pounds of feed. By operating the conveyor screw at a specific speed, for a specific period of time, a predetermined quantity of feed is delivered. For example, a 35 second operation of the screw can deliver 5 pounds of feed. Therefore, by regulating the time of operation of the motor 24, very precise quantity of feed can be delivered to the animal.

A typical application of the automatic feeder is to feed horses which are contained in their stalls and located side-by-side. Depending on the size and health conditions of the horse, a predetermined quantity of feed is fed to each individual horse. It is also important to feed all of the horses at the same time as the horses are usually in visual contact with neighbouring horses and if a horse was not fed, this would result in the unfed horse exhibiting some madness causing damage to the stall and possible injury to the horse. Also, in such large animal enclosures there may be contained several stalls and it can be seen that with the present invention all of these stalls can be equipped with a device 10 to deliver individual quantities and compositions of feed simultaneously to each stall, which was heretofore impossible with the prior art devices known.

The housing 11 can be constructed of stainless steel or plastics material to provide a sanitary enclosure and the reservoir 12 is properly sealed by the cover 15 whereby moisture, dust or other foreign matter cannot enter the enclosure to soil or contaminate the feed. The housing 11 is also provided with attachment flanges 31 whereby to secure the housing against the wall or other support structure.

As shown in FIG. 4, the automatic timer control 29 comprises a time clock mechanism coupled to a 24 hour time dial 32. A plurality of presettable contact trip elements 33 are positioned about the dial through a 24 hour period indicator. By presetting these trip elements at different times of the day, power from the electrical connector 34 will be supplied to the output line 35 which is connected to the time regulating device 30. This time regulating device 30 is provided with a dial 36 which is positioned to a preselected time period whereby to pass electrical power to its outlet line 37 for a predetermined period of time only. The outlet connection 37 is connected to the motor 24 to cause the operation thereof, as previously described.

In FIG. 4, there is also shown a controller device 38 capable of controlling a plurality of animal feeders 10. This controller can be connected directly to the time regulating device 30 of each feeder whereby to connect power thereto at preselected time intervals or else could cut-out one or more of these feeders by activating proper switches. Thus, it is conceivable that various systems can be arranged for automatic operation and wherein the controller could selectively operate one or more or specific groups of animal feeder devices 10.

It is within the ambit of the present invention to cover any obvious modifications of the preferred embodiment described herein, provided such modifications fall within the scope of the appended claims.

I claim:

1. An automatic animal feeder comprising a housing defining an enclosed feed reservoir, an inlet opening for receiving feed in said reservoir, an outlet opening, a discharge screw conveyor rotatably driven by a motor, said conveyor screw being located in a cylindrical tube having an opening in a sidewall thereof, a sleeve coupling said housing outlet opening with said opening in said sidewall of said cylindrical tube housing of said conveyor screw for communicating feed in said reservoir directly on a restricted central portion of said conveyor screw whereby said conveyor screw arrests the discharge of feed when idle, an outlet pipe connected to an outlet of said cylindrical tube to discharge said feed at said remote discharge outlet of said tube when said conveyor is rotated, and automatic timer control means for operating said motor at predetermined time intervals and for predetermined time periods to thereby control the quantity of feed discharged at said remote discharge outlet during each of said time intervals.

2. An automatic animal feeder as claimed in claim 1 wherein said automatic timer control means comprises a time clock mechanism having a presettable contact trip mechanism to cause said motor to operate at different selected time intervals, and a time regulating device to control the period of operation of said motor at said time intervals.

3. An automatic animal feeder as claimed in claim 2 wherein there is provided a system comprising a plurality of said housing with feed reservoir, and a controller circuit for selectively operating one or more or specific groups of said automatic timer control means whereby feed is delivered by selected ones of said feeders.

4. An automatic animal feeder as claimed in claim 2 wherein said conveyor screw has a drive shaft, a speed reducing coupling interconnecting said drive shaft with an output shaft of said motor.

5. An automatic animal feeder as claimed in claim 2 wherein said housing defining a feed reservoir is provided with attachment means to secure said housing at a desired position.

6. An automatic animal feeder as claimed in claim 1 wherein said housing has a hinged door for closing said inlet opening, and gauge means associated with said housing to determine the amount of feed stored in said housing.

7. An automatic animal feeder as claimed in claim 1 wherein said housing has a cone-shaped bottom wall, said outlet opening being located at the apex of said cone-shaped bottom wall.

* * * * *